United States Patent
Wu et al.

(10) Patent No.: US 6,383,335 B1
(45) Date of Patent: May 7, 2002

(54) HEAT BONDING APPARATUS FOR MANUFACTURING AN INK-JET PRINTHEAD

(75) Inventors: Ji-chen Wu; Chen-hua Lin, both of Hsinchu (TW)

(73) Assignee: Wisertek International Corp., Hsinchu (TW)

( * ) Notice: Subject to any disclaimer, the term of this patent is extended or adjusted under 35 U.S.C. 154(b) by 0 days.

(21) Appl. No.: 09/489,950

(22) Filed: Jan. 24, 2000

(30) Foreign Application Priority Data

Aug. 9, 1999 (TW) ........................................ 88215444 U

(51) Int. Cl.[7] .................................................. B30B 5/02
(52) U.S. Cl. .................. 156/583.3; 156/286; 156/583.1
(58) Field of Search ................................. 156/228, 285, 156/286, 580, 581, 583.1, 583.3

(56) References Cited

U.S. PATENT DOCUMENTS

| | | | | |
|---|---|---|---|---|
| 4,529,472 A | * | 7/1985 | Hsu ........................... | 156/498 |
| 4,551,965 A | * | 11/1985 | Prottengeier ................ | 53/463 |
| 4,953,287 A | * | 9/1990 | West et al. .................... | 29/611 |
| 5,261,997 A | * | 11/1993 | Inselmann ................... | 156/580 |
| 5,379,689 A | * | 1/1995 | Timmons et al. ............. | 100/43 |
| 5,820,724 A | * | 10/1998 | Diekwisch ................... | 156/382 |

* cited by examiner

*Primary Examiner*—James Sells
(74) *Attorney, Agent, or Firm*—Birch, Stewart, Kolasch & Birch, LLP

(57) ABSTRACT

A heat bonding apparatus for manufacturing an ink-jet printhead, whereby a flexible circuit tape is heat-bonded on the an IC chip of an ink-jet printhead so that a signal from the printing apparatus can be transmitted to the IC chip of the ink-jet printhead to control the ink-jet printing operation. The heat bonding apparatus comprises a head seat; a heat bonding head seated in the head seat, the heat bonding head being movable along with the head seat to carry out a heat bonding process; and a heat bonding sheet of arc shape and in the form of an elastic metal sheet. The heat bonding sheet is deformable under pressure and one end of the heat bonding sheet is secured to the heat bonding head so that when the heat bonding sheet is pressed for heat bonding the flexible circuit tape and the IC chip, the heat bonding sheet undergoes deformation and in the mean time pushes the air away from between the flexible circuit tape and the IC chip to let them fully contact each other.

9 Claims, 3 Drawing Sheets

HEAT BONDING APPARATUS FOR MANUFACTURING AN INK-JET PRINTHEAD

FIELD OF THE INVENTION

The present invention relates to a heat bonding apparatus for manufacturing an ink-jet printhead, and in particular, to an apparatus for heat bonding an IC chip and a flexible circuit tape of an ink-jet printhead in such a way that the efficiency and yield of heat bonding IC chips and the flexible circuit tapes are improved over the prior art.

BACKGROUND OF THE INVENTION

In the manufacturing process of a conventional ink-jet printing apparatus, the ink-jet printhead is mounted on the printing apparatus and then the ink-jet printhead is combined with an ink cartridge so that the ink-jet printhead can eject the ink from the ink cartridge. In the manufacturing process of another conventional ink-jet printing apparatus, the ink-jet printhead is mounted on an ink cartridge first and then the cartridge is mounted on the printing apparatus.

A conventional ink-jet printhead usually includes: an IC chip formed with a plurality of ink chambers and in each of the ink chambers is provided an ejecting device of heating element type or piezoelectric type; a flexible circuit tape formed with an ink orifice in alignment with each of the ink chambers of the IC chip in such a way that the ejecting device can eject the ink from the ink chamber via the ink orifice for printing. The flexible circuit tape transmits signals from the printing apparatus to the IC chip of the ink-jet printhead to control the printing operation of the ink-jet printhead.

Specifically, in the manufacturing process of a conventional ink-jet printhead, each ink chamber in the IC chip has to be in precision alignment with a corresponding ink orifice in the flexible circuit tape before bonding the flexible circuit tape and the IC chip by a heat bonding apparatus. Neverthess, in general heat bonding apparatus, a flat bonding head is used to press a flexible circuit tape onto an IC chip. After bonding between two flat surfaces, residual bubbles are often left in between the flexible circuit tape and the IC chip. The bubbles can make it impossible to efficiently achieve precision alignment between each of the ink orifices of the flexible circuit tape and the corresponding ink chamber of the IC chip. This adversely affects the manufacturing efficiency and yield of the ink-jet printhead.

SUMMARY OF THE INVENTION

It is accordingly an object of the invention to provide a heat bonding apparatus for manufacturing an ink-jet printhead whereby the IC chip of the ink-jet printhead can fully contact the flexible circuit tape and there is no bubble left between the IC chip and the flexible circuit tape so that each ink orifice in the flexible circuit tape is in pricision alignment with the corresponding ink chamber in the IC chip.

Another object of the invention is to provide a heat bonding apparatus for manufacturing an ink-jet printhead whereby the heat bonding head exerts a substantially uniform pressure on the the flexible circuit tape to bond it onto the IC chip of the ink-jet printhead.

To achieve the above objects, a heat bonding apparatus for manufacturing an ink-jet printhead of the invention is provided. A flexible circuit tape is heat-bonded onto an IC chip of an ink-jet printhead by the heat bonding apparatus so that a signal from the printing apparatus can be transmitted to the IC chip of the ink-jet printhead to control the ink-jet printing operation. The heat bonding apparatus comprises a head seat; a heat bonding head seated in the head seat, the heat bonding head being movable along with the head seat to carry out an arc-shaped heat bonding process; and a heat bonding sheet and in the form of an elastic metal sheet. The heat bonding sheet is deformable under pressure and one end of the heat bonding sheet is secured to the heat bonding head so that when the heat bonding sheet is pressed for heat bonding the flexible circuit tape and the IC chip, the heat bonding sheet undergoes deformation and in the mean time pushes the air away from between the flexible circuit tape and the IC chip to let them fully contact each other. Thereby, each of the ink orifices in the flexible circuit tape 10 can be in precision alignment with the corresponding ink chamber in the IC chip. Thus, the efficiency and yield of manufacturing ink-jet printheads can be improved.

BRIEF DESCRIPTION OF THE DRAWINGS

The above and other objects and advantages of the present invention will become apparent by reference to the following description and accompanying drawings wherein.

DETAILED DESCRIPTION OF THE PREFERRED EMBODIMENTS

Figure 1:
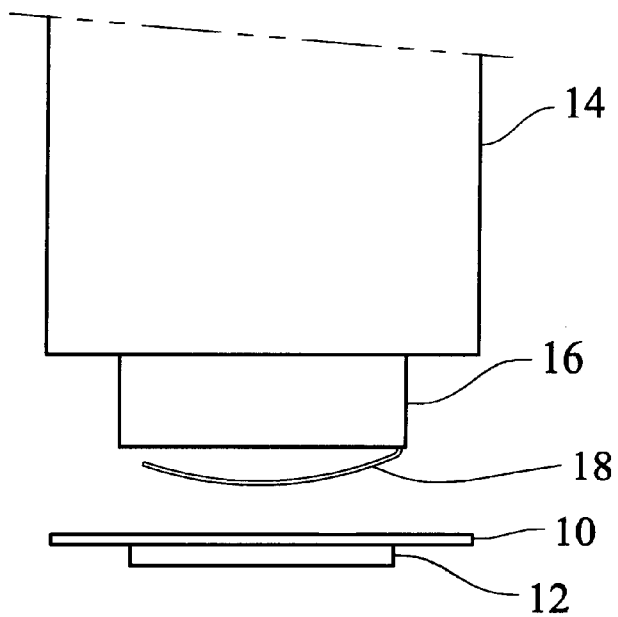
FIG. 1 is a view illustrating a heat bonding apparatus for manufacturing an ink-jet printhead in accordance with a first preferred embodiment of the invention.

Referring to FIG. 1 that shows a heat bonding apparatus for manufacturing an ink-jet printhead in accordance with a first preferred embodiment of the invention, whereby a flexible circuit tape 10 is heat-bonded on the an IC chip 12 of an ink-jet printhead so that a signal from the printing apparatus can be transmitted to the IC chip 12 of the ink-jet printhead to control the ink-jet printing operation, the heat bonding apparatus comprises a head seat 14; a heat bonding head 16 seated in the head seat 14, the heat bonding head 16 being movable along with the head seat 14 to carry out a heat bonding process; and a heat bonding sheet 18 of arc shape and in the form of an elastic metal sheet. The heat bonding sheet 18 is deformable under pressure and one end of the heat bonding sheet 18 is secured to the heat bonding head 16 so that when the heat bonding sheet 18 is pressed for heat bonding the flexible circuit tape 10 and the IC chip 12, the heat bonding sheet 18 undergoes deformation and in the mean time pushes the air away from between the flexible circuit tape 10 and the IC chip 12 to let them fully contact each other.

Figure 2:
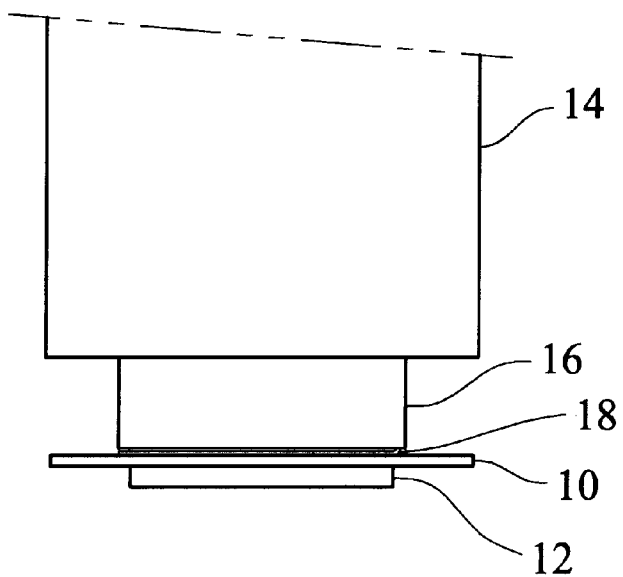
FIG. 2 is a view showing a position of the bonding head of the heat bonding apparatus as shown in FIG. 1, in the position, the bonding head presses a flexible circuit tape onto an IC chip.

Referring to FIG. 2, when the head seat 14 together with the heat bonding head 16 moves in the downward direction in a heat bonding process to press the flexible circuit tape 10 on the IC chip 12, the elastic metal sheet 18 undergoes deformation and the air in between the flexible circuit tape 10 and the IC chip 12 is pushed away, thereby effectively causes the the flexible circuit tape 10 and the IC chip 12 closely contact each other. The close contact makes it possible that each of the ink orifices in the flexible circuit tape 10 can be in precision alignment with the corresponding ink chamber in the IC chip.

Figure 3:
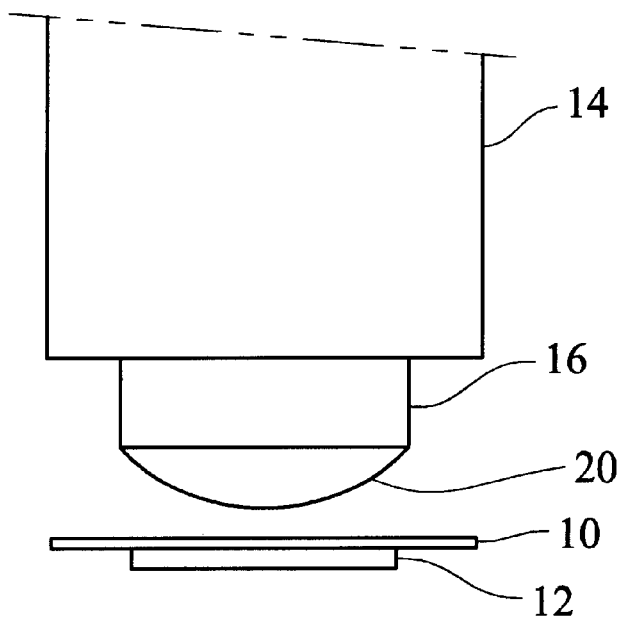
FIG. 3 is a view illustrating a heat bonding apparatus for manufacturing an ink-jet printhead in accordance with a second preferred embodiment of the invention.
Figure 4:
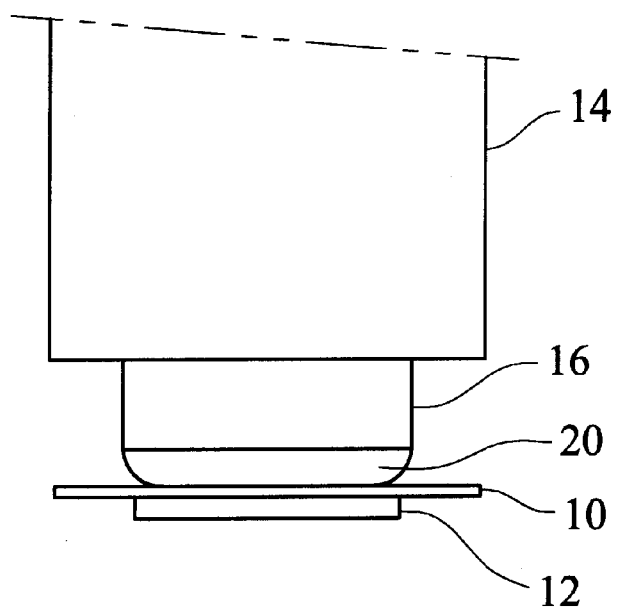
FIG. 4 is a view showing a position of the bonding head of the heat bonding apparatus as shown in FIG. 3, in the position, the bonding head presses a flexible circuit tape onto an IC chip.

Referring to FIGS. 3 and 4, the heat bonding sheet in the second preferred embodiment of the invention is in the form of an arc-typed plastic sheet 20. When the plastic sheet 20 presses the flexible circuit tape 10 on the IC chip 12, the pressure on the plastic sheet 20 causes it to deform and pushes the air away from between the flexible circuit tape 10 and the IC chip 12. Thus, the flexible circuit tape 10 and the IC chip 12 can fully contact each other and the efficiency and yield of manufacturing ink-jet printheads can be improved.

Figure 5:
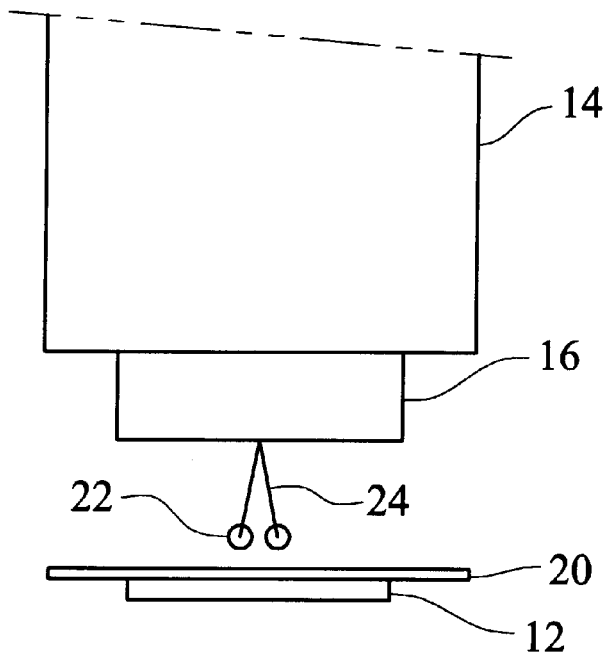
FIG. 5 is a view illustrating a heat bonding apparatus for manufacturing an ink-jet printhead in accordance with a third preferred embodiment of the invention.
Figure 6:
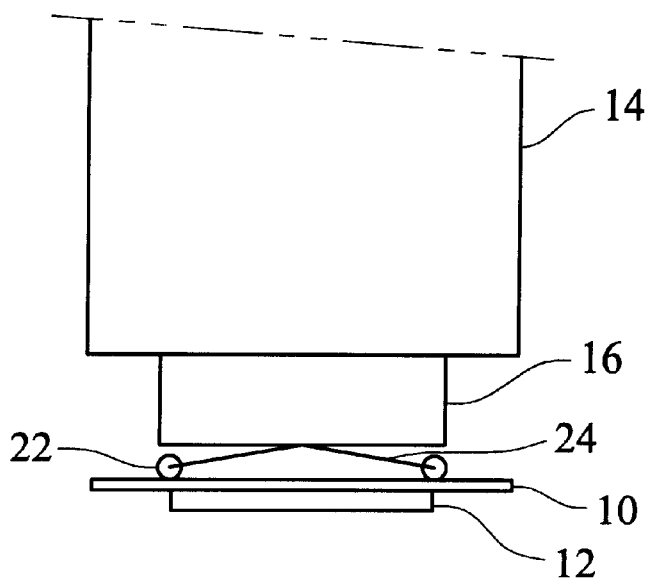
FIG. 6 is a view showing a position of the bonding head of the heat bonding apparatus as shown in FIG. 5, in the position, the bonding head presses a flexible circuit tape onto an IC chip.

Referring to FIGS. 5 and 6, the heat bonding sheet in the second preferred embodiment of the invention is replaced by two plastic pressing rollers 22. Each of the plastic pressing rollers 22 pivots on a pivot rod 24 that can be pivoted outward in such a way that, when the heat bonding head 16 moves down after contacting the flexible circuit tape 10, the pivot rod 24 is pivot outward and drives the corresponding plastic pressing roller 22 to roll outward and push the air away from between the flexible circuit tape 10 and the IC chip 12. Therefore, the the flexible circuit tape 10 and the IC chip 12 can be in close contact with each other to let each of the ink orifices in the flexible circuit tape 10 be in precision alignment with the corresponding ink chamber in the IC chip 12. Thus, the efficiency and yield of manufacturing ink-jet printheads can be improved.

While the invention has been described by way of example and in terms of three preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A heat bonding apparatus for manufacturing an ink-jet printhead of a printing apparatus by heat-bonding a flexible circuit tape onto an IC chip of an ink-jet printhead so that a signal from the printing apparatus can be transmitted to the IC chip of the ink-jet printhead to control the ink-jet printing operation, the heat bonding apparatus comprising:

a head seat;

a heat bonding head seated in the head seat, the heat bonding head being movable along with the head seat to carry out a heat bonding process; and a heat bonding sheet mounted on the heat bonding head and being deformable under pressure so that when the heat bonding sheet is pressed for heat bonding the flexible circuit tape and the IC chip, the heat bonding sheet undergoes deformation and in the mean time pushes the air away from between the flexible circuit tape and the IC chip to let them fully contact each other.

2. A heat bonding apparatus for manufacturing an ink-jet printhead according to claim 1, wherein the flexible circuit tape is formed with a plurality of ink orifices and corresponding to each of the ink orifices is formed an ink chamber in the IC chip of the ink-jet printhead.

3. A heat bonding apparatus for manufacturing an ink-jet printhead according to claim 1, wherein the heat bonding sheet is an arc-shaped elastic sheet.

4. A heat bonding apparatus for manufacturing an ink-jet printhead according to claim 3, wherein the arc-shaped elastic sheet is made of metal.

5. A heat bonding apparatus for manufacturing an ink-jet printhead according to claim 1, wherein the heat bonding sheet is an arc-shaped plastic sheet.

6. A heat bonding apparatus for manufacturing an ink-jet printhead of a printing apparatus by heat-bonding a flexible circuit tape onto an IC chip of an ink-jet printhead so that a signal from the printing apparatus can be transmitted to the IC chip of the ink-jet printhead to control the ink-jet printing operation, the heat bonding apparatus comprising:

a head seat;

a heat bonding head seated in the head seat, the heat bonding head being movable along with the head seat to carry out a heat bonding process; and two plastic rollers, each of the rollers pivoting on a pivot rod secured to the heat bonding head so that when the two plastic rollers are pressed for heat bonding the flexible circuit tape and the IC chip, the two plastic rollers pushes the air away from between the flexible circuit tape and the IC chip to let them fully contact each other.

7. A heat bonding apparatus for manufacturing an ink-jet printhead according to claim 6, wherein the flexible circuit tape is formed with a plurality of ink orifices and corresponding to each of the ink orifices is formed an ink chamber in the IC chip of the ink-jet printhead.

8. A heat bonding apparatus for manufacturing an ink-jet printhead according to claim 6, wherein the heat bonding sheet is an arc-shaped elastic sheet.

9. A heat bonding apparatus for manufacturing an ink-jet printhead according to claim 8, wherein the arc-shaped elastic sheet is made of metal.

* * * * *